Oct. 29, 1968  P. W. POEHLMANN  3,407,582
FRUIT HARVESTER
Filed Dec. 20, 1965  9 Sheets-Sheet 3
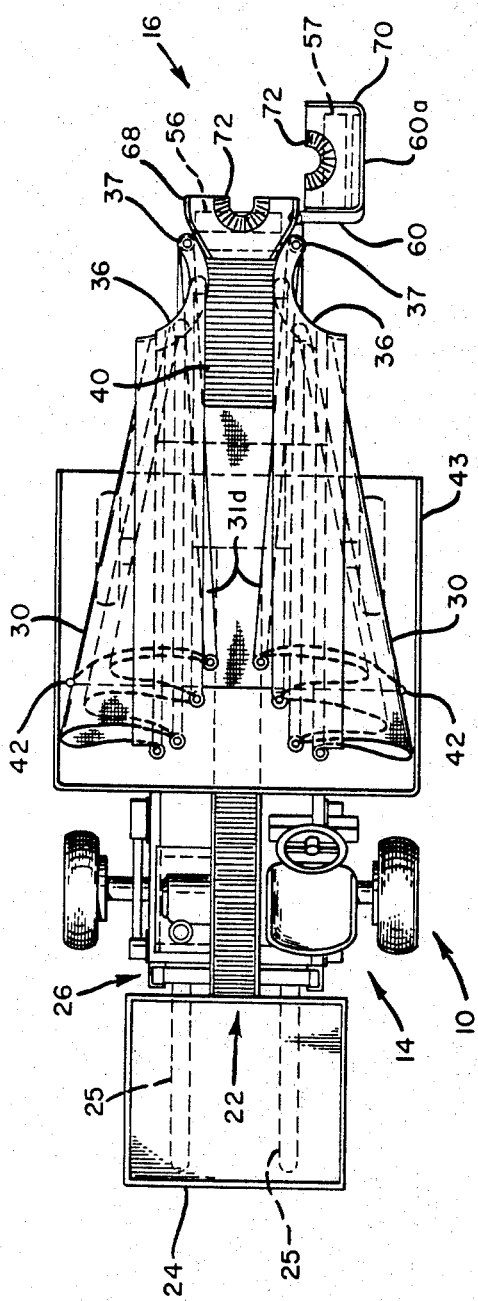
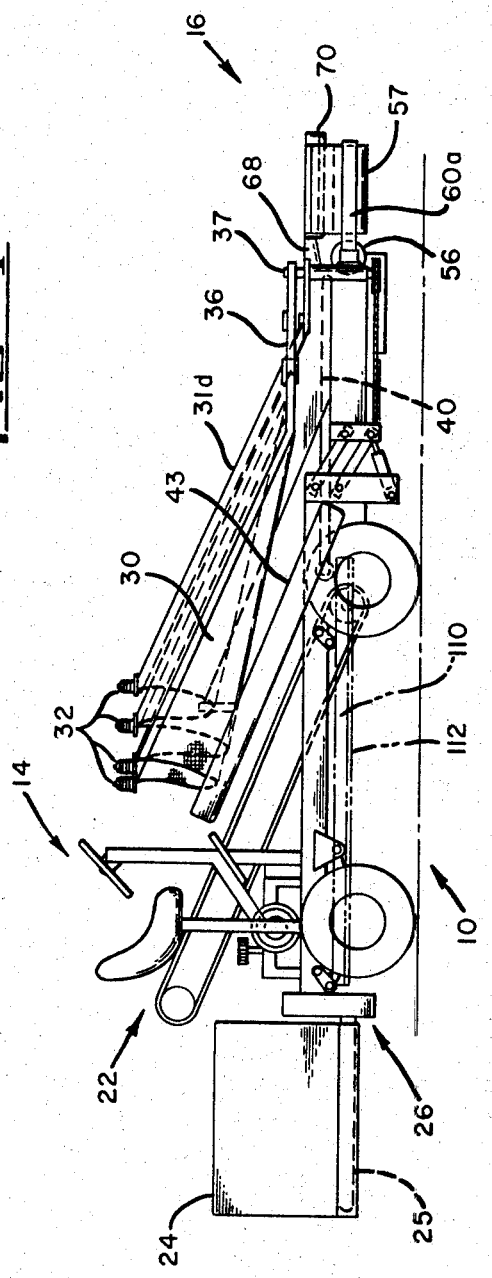
INVENTOR.
PAUL W. POEHLMANN
BY  Gregg & Stidham
ATTORNEYS

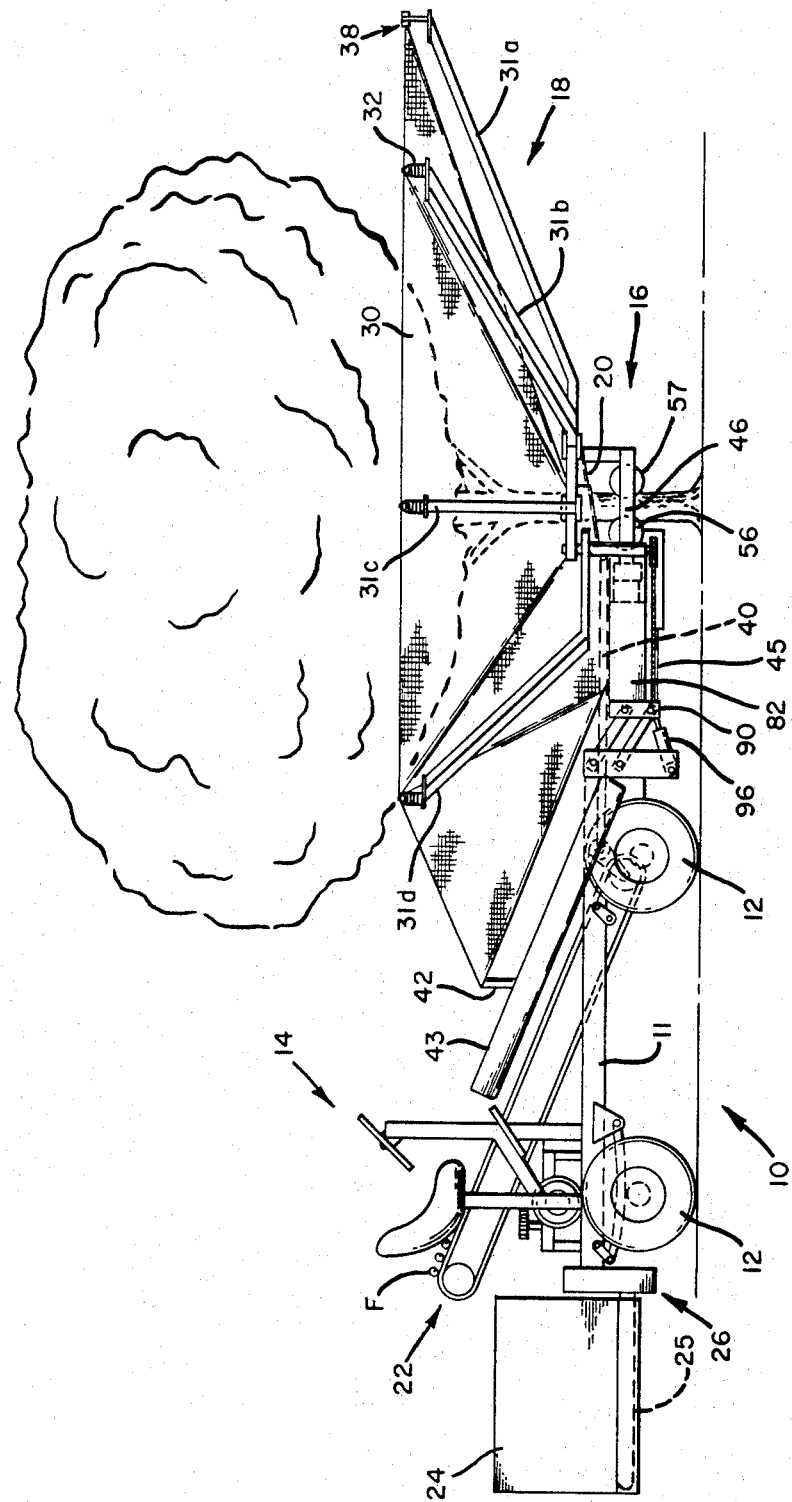

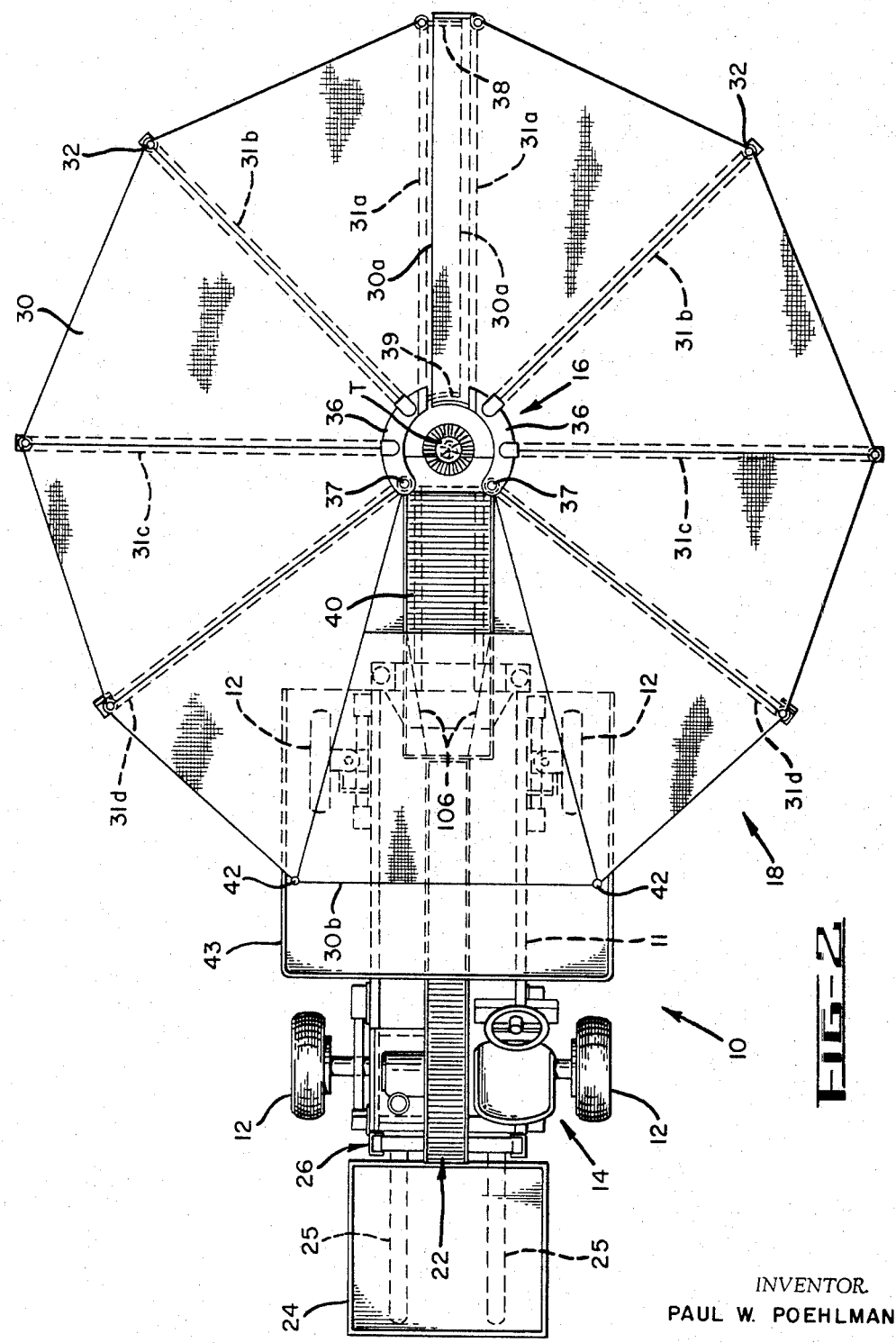

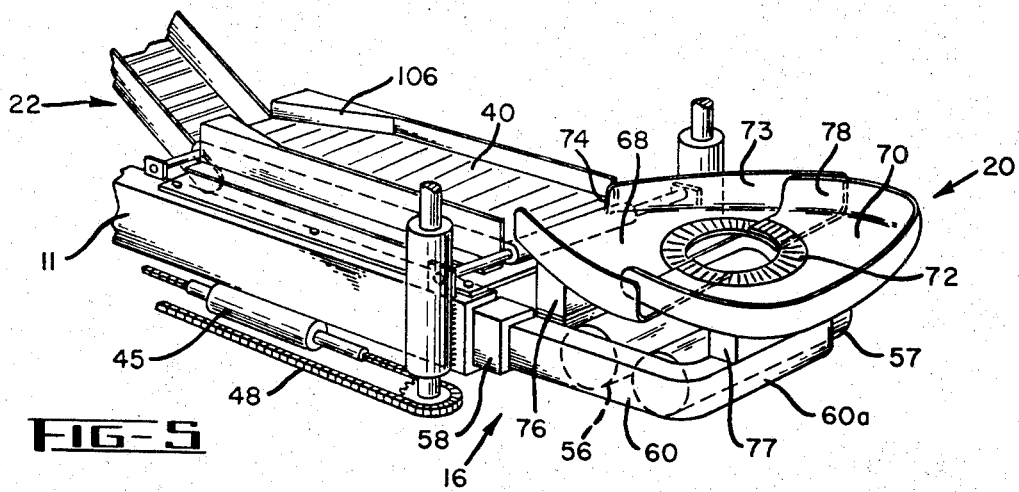

INVENTOR.
PAUL W. POEHLMANN
BY Gregg & Stidham
ATTORNEYS

Oct. 29, 1968 P. W. POEHLMANN 3,407,582
FRUIT HARVESTER
Filed Dec. 20, 1965 9 Sheets-Sheet 6
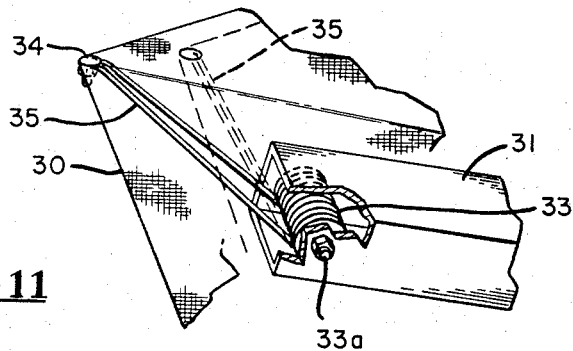
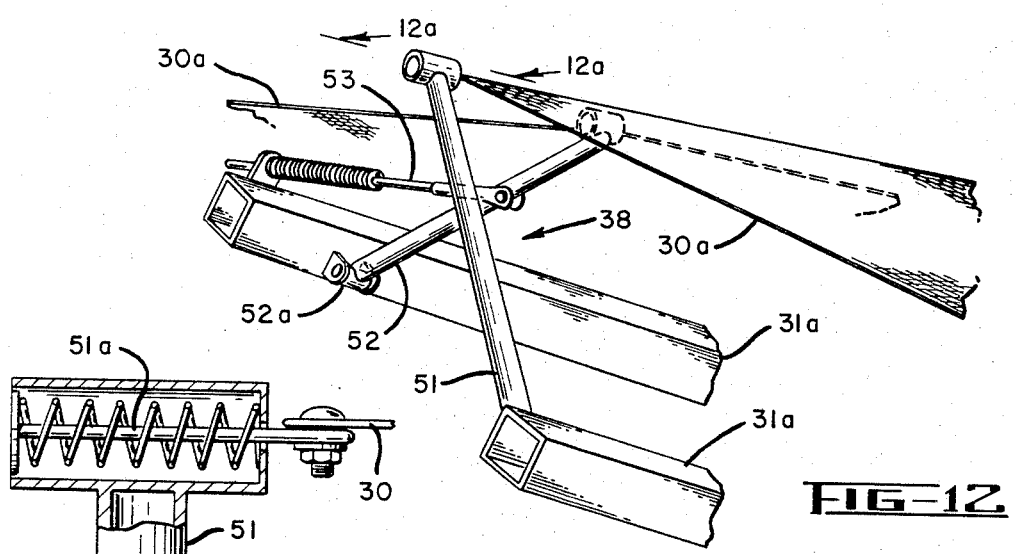
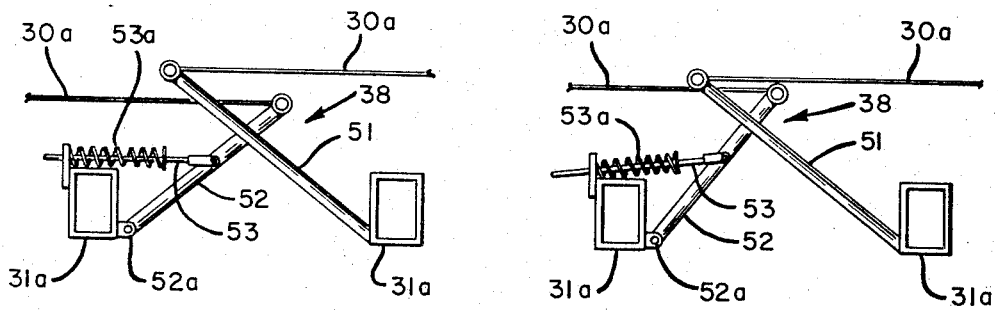
INVENTOR.
PAUL W. POEHLMANN
BY Gregg & Stidham
ATTORNEYS Oct. 29, 1968     P. W. POEHLMANN     3,407,582
FRUIT HARVESTER
Filed Dec. 20, 1965                                          9 Sheets—Sheet 7
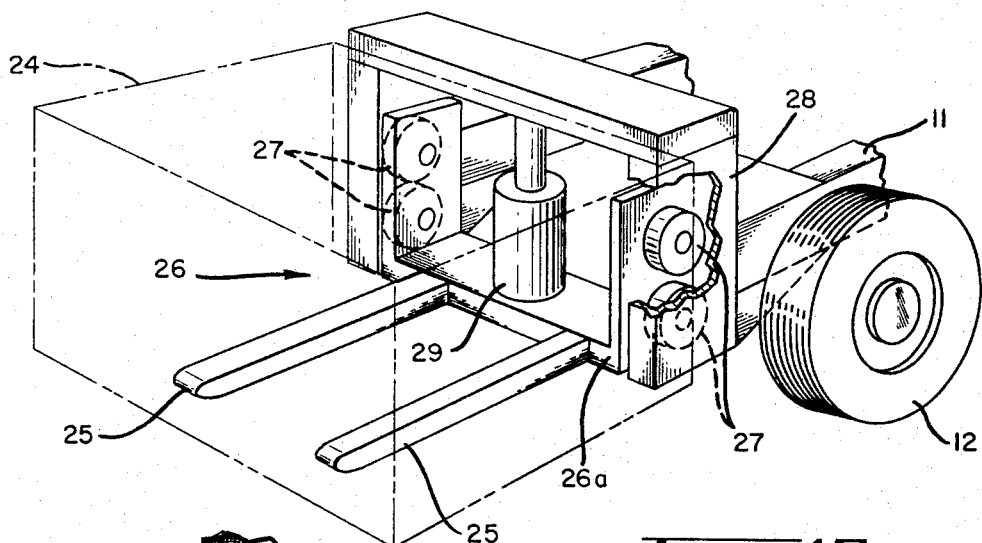
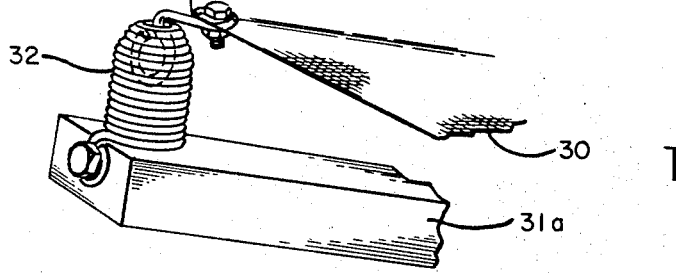
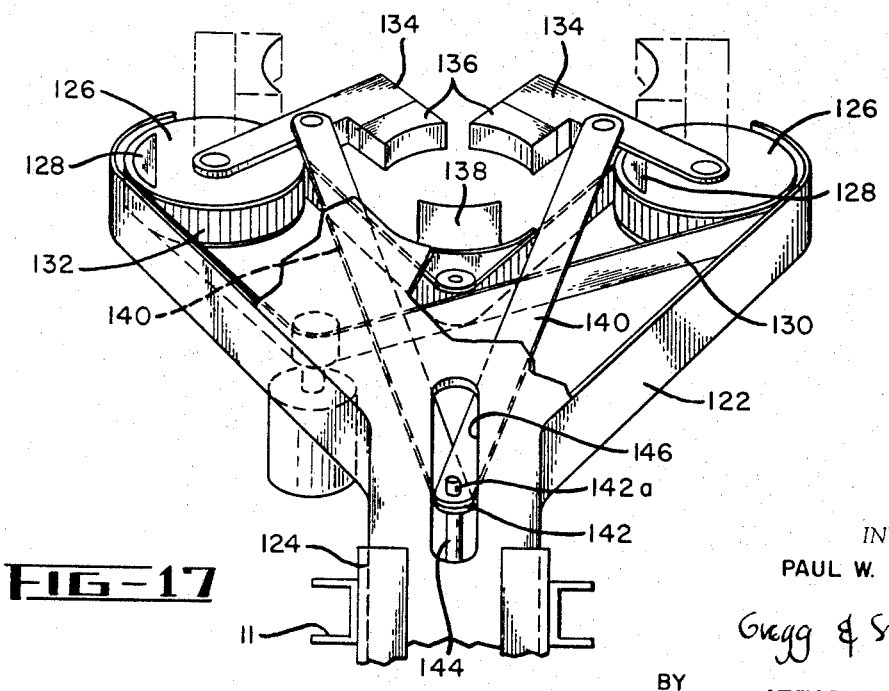
INVENTOR.
PAUL W. POEHLMANN
Gregg & Stidham
BY     ATTORNEYS

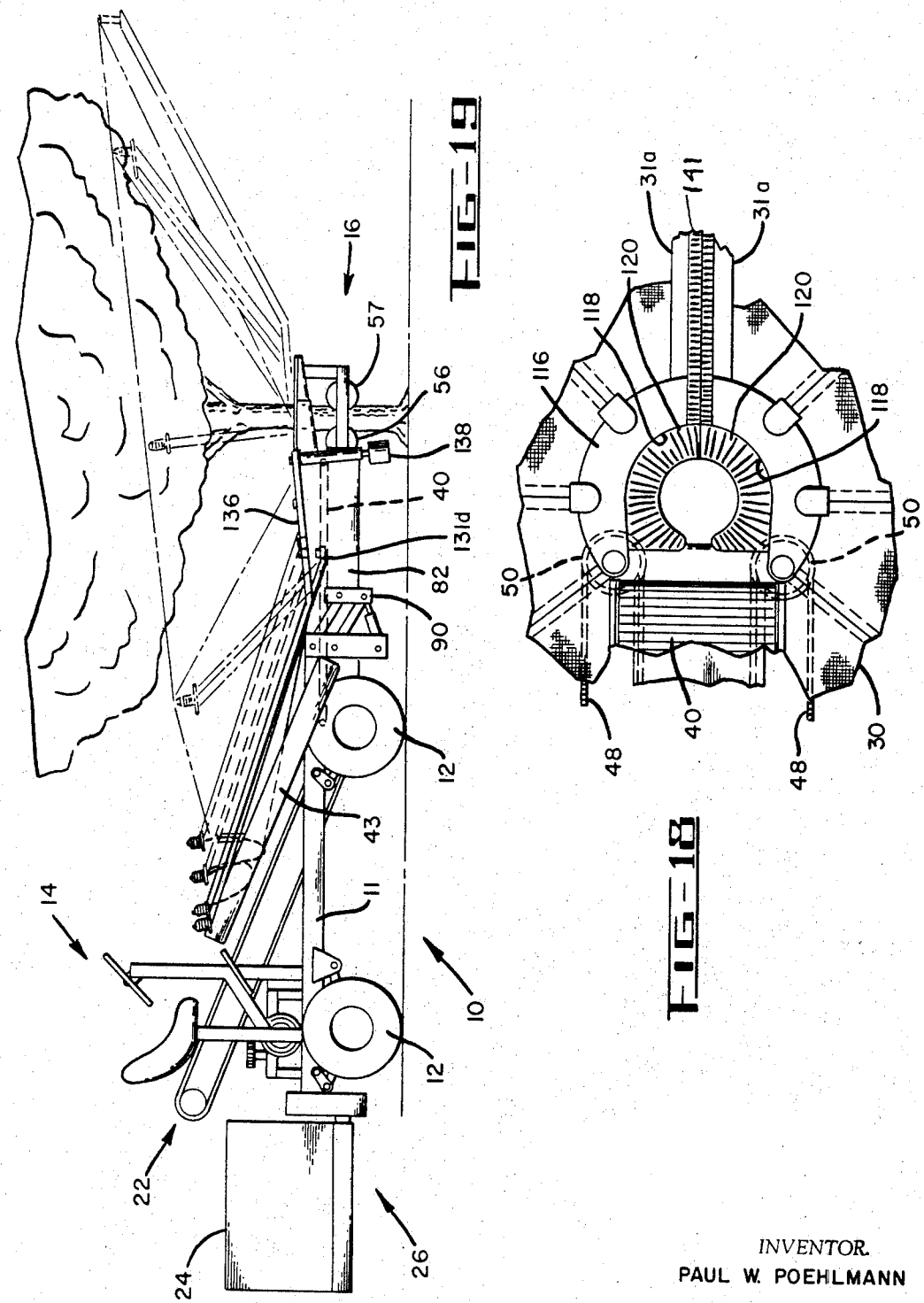

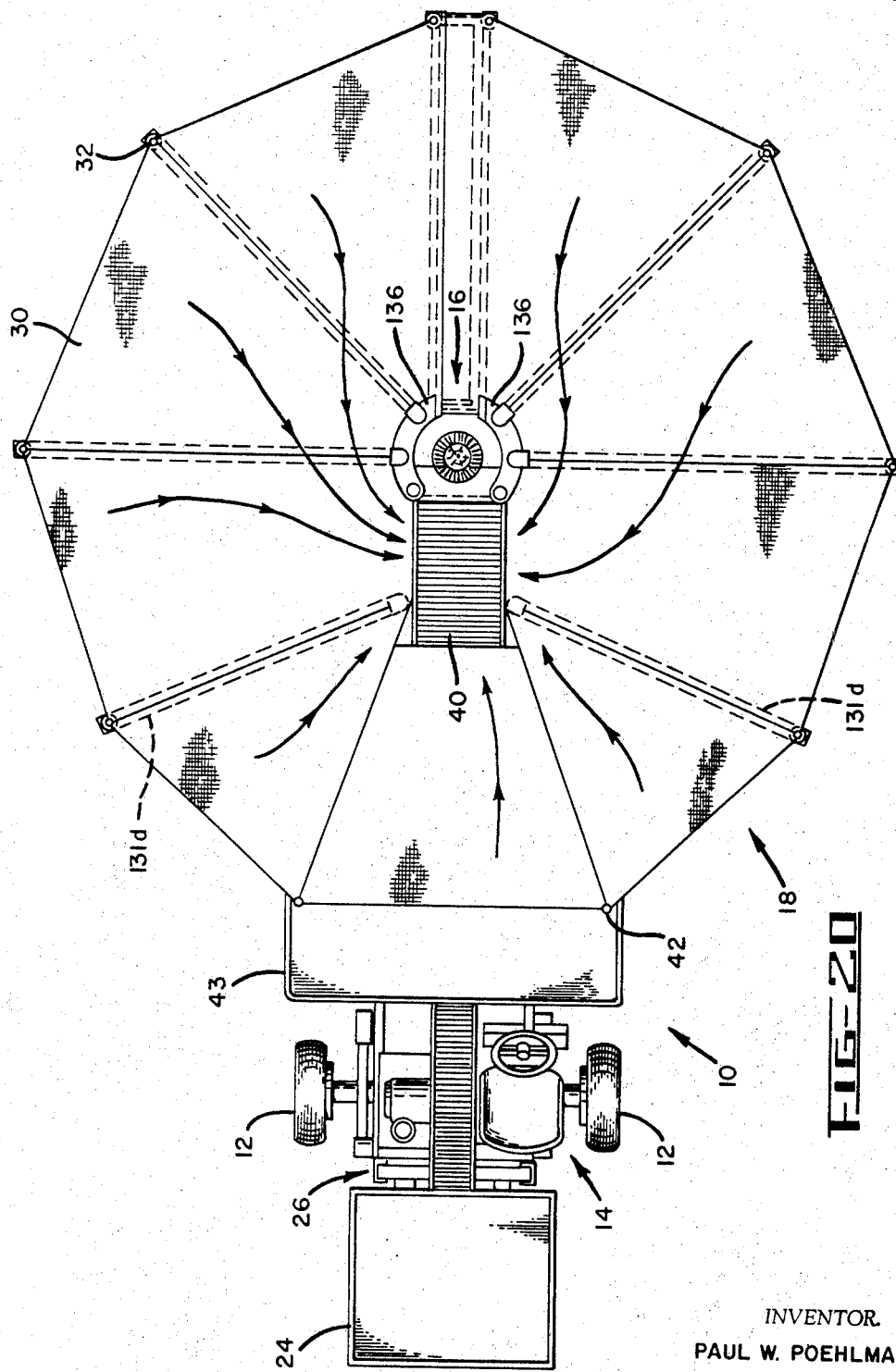

3,407,582
FRUIT HARVESTER
Paul W. Poehlmann, 20 Oak Ave.,
San Anselmo, Calif. 94960
Filed Dec. 20, 1965, Ser. No. 514,932
14 Claims. (Cl. 56—329)

This invention relates to a fruit harvester and, more particularly, to a highly portable vehicle which is movable to engage and shake a tree, and which is adapted to catch the fruit as it falls from the branches and deliver it to a suitable container.

According to currently practiced methods of harvesting fruit, a suitable sheet or receptacle is spread beneath the branches of a tree by one crew of workers, and then another crew of workers moves a tree shaking device into place to engage the trunk of the tree and to shake the fruit into the receiving sheet or receptacle. Such methods suffer the disadvantage of large crew requirements and, in addition, the fruit catching devices are generally unwieldy and not readily transported from one tree to the next. Moreover, a considerable amount of fruit is damaged by reason of inadequate cushioning.

It is, therefore, an object of this invention to provide a fruit harvester that is of extremely compact construction.

It is a further object of this invention to provide a fruit harvesting vehicle including a fruit catching receptacle that is large enough to underlie an entire tree, but which may be folded compactly for transportation from one tree to the next.

It is a further object of this invention to provide a fruit harvesting vehicle which may be operated by a single person.

It is a further object of this invention to provide a highly portable fruit harvesting vehicle having self-contained devices for shaking a tree, for catching fruit being dropped from the tree, and for transporting the fruit to a suitable container.

In carrying out this invention, I provide a retractable, inverted umbrella-like drape which functions as a cushioned fruit catcher. Such fruit catcher preferably comprises a pair of arcuate arms pivotably mounted on the forward end of a vehicle so as to pivot from a retracted position to an operating position embracing the trunk of a tree. Supporting rods extend upwardly and outward from the arms and the flexible sheet drape is supported on the ends of the rods. Support rods are fixed on the ends of the pivotable arms, but the other support rods are pivoted so that when the arms are retracted the rods collapse together in nested relationship over the vehicle. In this connection, the arms are preferably mounted on shafts which are inclined slightly toward the rear of the vehicle so that when the arms are retracted, the arms, the support rods and the drape are inclined at a lower level for better driver visibility.

In combination with the fruit catcher I also provide a resilient gasket which also is separable in retracted position but which may be pivoted to embrace the tree trunk snugly without damaging it, and catch any fruit which would otherwise fall to the ground inside the pivoted arms.

In addition, if desired, the vehicle may also be provided with a tree shaking device which may comprise a pair of resilient bumpers for engaging opposite sides of the tree. In such case, the complementary elements of the tree engaging gasket may be carried to move with the bumpers to engage and seal around the trunk of a tree just above the bumpers. One bumper and one component of the gasket may be carried on the forward end of the vehicle, with the other element being carried on an arm which is pivoted in advance and to one side, out of alignment with the first bumper, so that the vehicle may be moved to bring the first bumper into contact with the tree without interference with the second bumper. Then the second bumper and the complementary gasket element carried thereby are swung inwardly and back toward the rear of the vehicle to engage the opposite side of the trunk of the tree. With the shaking bumpers and gasket elements in place, the pivoted arms with their drape supporting rods, are pivoted around the trunk of the tree so that the drape assumes a generally frusto-conical, umbrella-like configuration. With the umbrella-like fruit catcher in place, a vibrating mechanism is energized to reciprocate the bumpers against the trunk of the tree and shake the fruit from the tree into the flexible sheet fruit catcher, with the gasket sealing around the tree to prevent fruit loss adjacent the trunk. From the fruit catcher drape, the fruit falls by gravity into a storage container or onto a moving belt conveyor mechanism which carries the fruit upwardly and rearwardly to a box that is carried at the rear of the machine.

Other objects and advantages of this invention will become apparent from the specification following when read in conjunction with the accompanying drawings wherein:

FIG. 1 is a side elevation view showing my fruit harvesting vehicle in condition for operation;

FIG. 2 is a top view of the fruit harvesting vehicle;

FIG. 3 is a side view similar to FIG. 1 but with the fruit receiving receptacle retracted;

FIG. 4 is a top view similar to FIG. 2 but with the fruit receiving receptacle retracted;

FIG. 5 is an enlarged partial isometric view of the complementary funnel elements with tree shaking bumpers included;

FIG. 6 is an enlarged partial isometric view of the tree shaking bumpers in condition for operation;

FIG. 7 is an enlarged partial isometric view showing the forward tree shaking bumper pivoted aside;

FIG. 11 is an enlarged isometric view of the resilient support means securing the fruit catcher drape to the pivoted support arms;

FIG. 12 is an enlarged isometric view of the means for securing the drape on the fixed support arms;

FIG. 12A is an enlarged section view taken along line 12A—12A of FIG. 12;

FIGS. 13 and 14 illustrate the method of closing and sealing the fruit catcher drape;

FIG. 15 is an isometric view, cut away in part, showing the fruit box lifting means;

FIG. 16 is a partial isometric view of an alternate form of drape securing means;

FIG. 17 is an isometric view partially cut away showing an alternate form of free shaking mechanism;

FIG. 18 shows an alternate form of three enclosing mechanism;

FIG. 19 is a side view of an alternate form of fruit catching drape; and

FIG. 20 is a top view of the fruit catching drape of FIG. 19.

Figure 8:
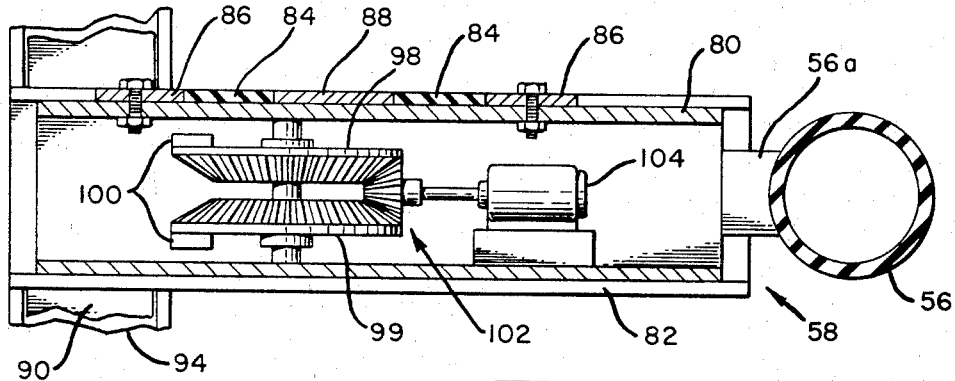
FIG. 8 is an enlarged vertical section view taken along line 8—8 of FIG. 6.

Referring now more particularly to FIG. 1, the fruit harvesting vehicle 10 of this invention comprises a frame 11 mounted on wheels 12 and includes an operator station 14, a tree shaking mechanism 16, an umbrella-like fruit catcher 18, a basket 20 for sealing around a tree to prevent fruit loss, and a conveyor 22 for delivering fruit F to a suitable container 24. Preferably, the container 24 is supported on the tines 25 of a fork-lift mechanism 26 (FIG. 15) which may include a carriage 26a mounted on rollers 27 for movement along a vertical track 28 carried on the vehicle frame 11. The carriage 26a is raised and lowered by a suitable means, such as a hydraulic cylinder 29. The fork-lift mechanism enables the operator to place the boxes 24 in various locations about an orchard being harvested and, when full, one box 24 may be deposited in a convenient location and another box raised on the tines 25 to continue harvesting.

Referring more particularly to FIGS. 1 to 4, the fruit catcher 18 comprises a flexible drape 30 of canvas, plastic or the like which is of generally frusto-conical configuration. The drape 30 is supported at its inner periphery on bars 36 and on its outer periphery on the upper ends of upwardly diverging supporting rods 31a to 31d. As shown in FIG. 1, the flexible drape may be secured to torsion or helical extension springs 32 that are carried on the ends of the support arms 31a to 31d. The size and configuration of the sheet 30 is such that the springs 32 are under bending stresses when the fruit-catcher is fully opened to the position of FIG. 2. Conversely, the sheet 30 is under tension to elevate it above the rods 31a to 31d so that there is a complete cushion for the dropping fruit.

Referring to FIG. 11, an alternative embodiment is shown wherein a torsion spring 33 is secured to the end of the arm 31 as by a bolt 33a and the drape 30 is secured at 34 to the end of an arm extension 35 of the spring 33.

In the preferred embodiment shown in FIG. 1, the leading support rods 31a are welded or otherwise fixed to the ends of arcuate arms 36 which are mounted on the stub shafts 37 rotatably mounted on the frame of the vehicle 12. The fruit catcher 18 is closed between the leading rods 31a by overlapping portions 30a of the ends of the sheet material 30 which are carried on tangentially or circumferentially extending members 38, 39 carried on the outer and inner ends of the leading support rods 31a. The means for closing the drape seam will be described in greater detail hereinafter.

A transfer conveyor 40 moves rearwardly in a generally horizontal plane from between the stub shafts 37 for the pivotable arcuate arms 36 to pass below the leading edge of a fixed panel 30b of the flexible sheet. The fixed drape panel 30b may be supported on posts 42 fixed to the vehicle frame. While my invention is not so limited, tests have demonstrated that a minimum angle of slope of about 20° is desirable for the frusto-conical fruit catcher 18. But whatever angle is chosen, the upper edge of the fixed panel 30b can be lower than those around the remainder of the drape 30 because it slopes upward from the conveyor 40 at a point more remote from the center of the cone. Thus, the full outer dimension is reached at a substantially lower height than is required if the slope started at the arcuate arms 36.

As previously stated, the leading arms 31a are fixed to the pivotable arcuate arms, and the rear posts 42 are, of course, stationary. Between them, the intermediate rods 31b, 31c and 31d are pivotally mounted so that they will collapse together over the drape support plate 43 on the vehicle. For optimum nesting, the arms 31d are pivoted on the stub shaft 37 below the arcuate arms 36 so that, when retracted, they will partially underlie the other support rods 31a to 31c, as shown in FIGS. 3 and 4. As the arcuate arms swing back the fixed arms 31a engage and retract the next arms 31b so that the arms fold progressively until the sides of the arms 31d are engaged by the adjacent arms 31c, whereby all arms are retracted over the drape support plate 43.

Figure 10:
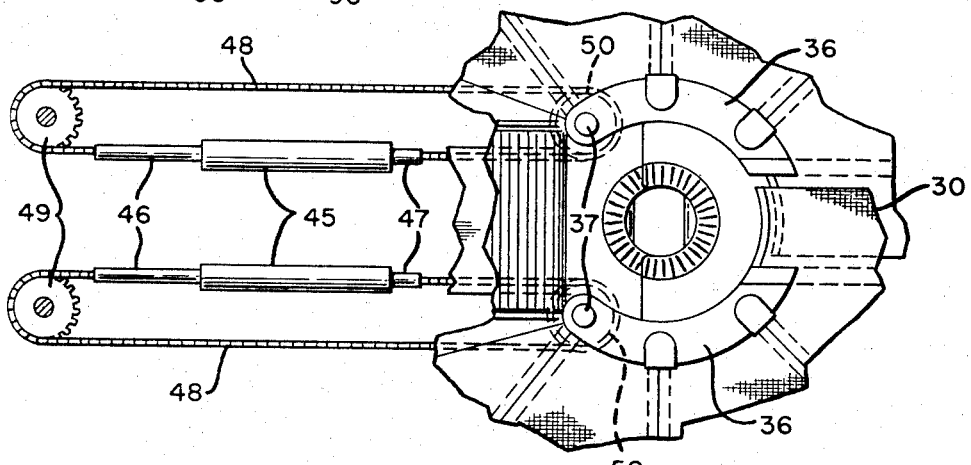
FIG. 10 is an enlarged view partially cut away showing mechanism for operating the fruit receiving receptacles.

Referring now to FIG. 10, one device for pivoting the arcuate arms 36 may comprise two-way hydraulic cylinders 45 with piston rods 46 and 47 secured to opposite ends of chains 48 on sprockets 49 and 50, the sprocket 50 being carried on the stub shaft 37. Thus, if the hydraulic cylinder 45 is actuated, the piston rods 46 or 47 will pull the chain 48 to rotate the sprocket 50 and, hence, the stub shaft 37. This, of course, will swing the arcuate arms 36 between the extended position of FIG. 2 and the retracted position of FIG. 3.

Referring now to FIGS. 12, 13 and 14 the mechanism for closing and sealing the drape ends will now be described. As there shown, a tangential extension 38 may comprise, on one fixed arm 31a, a fixed extension 51, which is welded or otherwise rigidly secured thereto, and a complementary tangential arm 52 which is pivoted at 52a to the other fixed arm 31a. A link 53 is biased by spring 53a normally to hold the pivoted arm 52 in the position shown in FIG. 13, but, since the spring 53a is yieldable, the arm 52 may be pivoted counterclockwise to the position shown in FIG. 14.

Thus, as the arcuate arms 36 pivot to swing the fixed support rods 31a toward each other, the extended pivoted arm 52 passes beneath the leading portion 30a of the other drape section. Then as the fixed arms complete their movement the drape 30 is drawn taut and it pulls the arm 52 back to pivot it, against the action of the spring 53a, up against the underside of the other drape end portion 30a. This closes and seals the fruit catcher drape 30. As shown in FIG. 12A, a spring biased rod 51a may be provided to yieldably secure the drape 30 tight and elevated above the arms 31a for a complete cushioned receptacle for fruit.

As best shown in FIGS. 5 to 8, the tree shaking apparatus 16 comprises back and front resilient bumpers 56 and 57 which are mounted on the forward end of a reciprocating shaker apparatus 58. The forward resilient bumper 57 is carried on an inwardly directed leg 60a of an articulated arm 60. The resilient bumpers may be formed of hollow rubber cylinders with a partial, yieldable filler as, for example, sand. As shown best in FIG. 7, the articulated arm 60, carrying the forward bumper 57 is pivoted at 61 to an extension 62 of the piston rod 63 of a hydraulic cylinder mechanism 64. As shown particularly in FIG. 6, when the piston rod 63 is retracted, the articulated arm 60 is withdrawn into a sleeve-like restraining member 65 which holds the articulated rod 60 in a position generally parallel to the horizontal axis of the vehicle 10. However, when the piston rod 63 is extended to the position shown in FIG. 7, a torsion spring 66 on the articulated arm at the pivot pin 61 forces the articulated arm 60 outward so as to be in advance of and out of alignment with the trunk T of the tree.

Movable in conjunction with the first and second shaker bumpers 56 and 57 are first and second complementary elements 68 and 70 of a trunk-sealing gasket device 20. The components 68 and 70 are preferably formed of fairly rigid sheet material, such as metal or plastic, with resilient gasket elements 72 at the inner edges so that when they engage the tree trunk they seal around it to prevent fruit loss without scraping or bruising the trunk. The rear element 68 has side rails 73 and a chute opening 74 which directs fruit onto the conveyor 40. This rear element is carried on a bracket 76 secured to the top of the shaker assembly 58 and the forward element 70 may be carried on a bracket 77 which is rigidly secured to the inturned leg 60a of the articulated arm 60. The forward gasket element 70 has upright walls 78 around three sides and is of an elevation that the two components nest together, as shown in FIG. 5, to snugly engage around a tree trunk (FIG. 2). The rearward gasket element 68 is simply moved into engagement by driving the vehicle against the trunk of the tree with the articulated arm 60 pivoted out of the way in the position shown in FIG. 7. Then, by retracting the piston rod 63, the articulated arm 60 is pulled rearwardly and forced inwardly until the second gasket element 70 snugly engages the tree trunk T. After the fruit is all collected, the piston rod is again extended and the articulated arm 60 is pivoted outwardly by the torsion spring 66 so that the vehicle may be reversed free of the tree and moved on to the next one.

With the tree shaking bumpers and the gasket element in place in the positions shown in FIGS. 5 and 6, the conical fruit catcher 18 is then extended into the position shown in FIG. 2 with the arcuate arms 36 embracing the tree in spaced relationship thereto. When so extended, the leading support rods 31a, and particularly the tangential arms 51 and 52, carrying the extending portions 30a of the sheet into overlapping relation to form a complete receptacle unitary with the gasket elements 68 and 70, and the conveyor 40.

Figure 9:
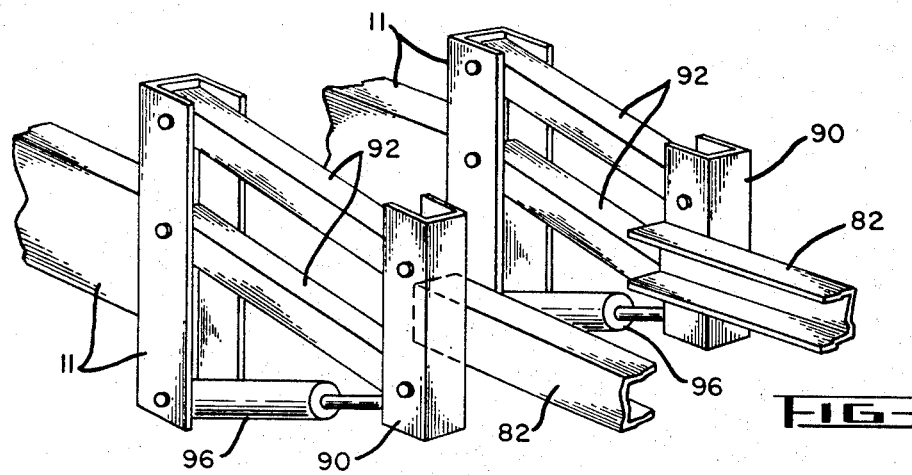
FIG. 9 is an enlarged partial isometric view showing the mounting for the shaker assembly.

Now, with the arcuate arms 36 embracing the tree trunk T, my tree harvesting vehicle is conditioned for actual harvesting operation by shaking the tree. This is accomplished by energizing the tree shaking apparatus shown in cross-section in FIG. 8. As shown there, the rear bumper 56 is carried on an arm 56a which in turn is secured to a reciprocating subhousing 80 which is freely slidable between the channels 82 on the vehicle frame. A pair of rubber compression blocks 84 are provided between bearing plates 86 and 88 on the subhousing 80 and channels 82 respectively in order to absorb any vibratory forces and prevent them from being transmitted to the vehicle 10 through the channels 82. Preferably, the entire assembly is vertically adjustable, as shown in FIG. 9, by supporting the shaker slide channels 82 on a support member 90 which, in turn, is pivotally mounted on parallel arms 92 also pivoted on the frame 11, so that the elevation of the bumpers 56 and 57 may be adjusted by operation of a suitable force-transmitting member such as hydraulic cylinders 96.

In operation, the subhousing 80 is reciprocated to deliver forces to a tree by operation of a pair of wheels or discs 98 and 99 (FIG. 8) which are identically weighted at 100 so that in the 180° position of the discs, i.e., concentric with the longitudinal center line of the vehicle, the weights are perfectly concentric. Then, the discs are counter-rotated so that as one disc rotates clockwise the other disc rotates counterclockwise. Hence, any lateral components of force are effectively cancelled out, and only longitudinal components are effective. Since the weights 100 are always moving in the same longitudinal direction the centrifugal forces are additive in the longitudinal directions until at each 180° point in the rotation of the discs the longitudinal components of force are reduced to zero. At that stage the lateral components are at a maximum, but since they are directed oppositely, they are completely cancelled out. Similarly, at the 90° and 270° angles of rotation, the only components of force are in the same longitudinal direction tangential to the discs, and the force delivered to the bumpers 56 and 57 is at maximum.

Rotation of the discs may be effected by means of conical gears 102 so that the discs are counterrotated positively without any slippage. The drives may be powered by any suitable means such as the motor 104. If desired, one of the discs 98 or 99 may be of a different size or have a different number of teeth so that the discs will rotate at slightly different speeds. In such arrangement the weights 100 deliver progressive additive circumferential radial forces at different points in their rotation and the shaker forces tend to rotate rather than remain in the same reciprocal directions.

Referring now to FIGS. 2 and 4, it is apparent that any fruit that drops into the fruit receiving receptacle 18 is cushioned by the flexible sheet 30 and rolls along the slight incline to drop onto the conveyor 40 or into the space between the tree trunk T and the arcuate arms 36, in which case the fruit is in the gasket chute 20 and from there is directed onto the moving conveyor 40 which carries the fruit back between converging side rails 106 and onto the transfer conveyor 22 which transports the fruit back to the box 24 carried at the rear of the vehicle 10.

Summarizing operation of my fruit harvester, the vehicle approaches the tree trunk T with the conical fruit catcher 18 fully retracted, i.e., with the arcuate arms 36 pivoted back over the vehicle, and with the forward bumper cylinder 57 and the forward gasket element 70 pivoted forwardly and to one side in the position shown in FIG. 7. Then, the vehicle 10 is driven forward until the rear bumper 56 and funnel or gasket element 68 are firmly but yieldably engaged with the tree trunk T. In this position, the hydraulic cylinder is actuated to retract the piston rod 63 and, with it, the articulated arm 60. When the articulated arm 60 passes within the restraining sleeve 65 it is pivoted inwardly toward the longitudinal axis of the vehicle until it is parallel with that axis and then further retraction pulls it into firm engagement with the tree trunk to the position shown in FIG. 5. This pivotal movement also swings the forward gasket component 70, which is also carried on the articulated arm 60, into engagement with the tree trunk to form a complete, sealed receptacle firmly engaged with the tree to catch fruit dropping through the conical fruit catcher 18. With the bumper assembly so placed, the hydraulic cylinders 45 (FIG. 10) controlling the fruit catcher are energized so that the chains 48 rotate the sprockets 50 to swing the arms 36 forwardly until with the leading support rods 31a close the conical fruit catcher.

With the vehicle thus placed for harvesting, power is now directed to the tree shaker motor 104 (FIG. 8) to rotate the discs 98, 99 in opposite directions and so that centrifugal forces produced by rotation of the weights 100 deliver a series of reciprocating impulses to the trunk of the tree effectively to shake it and dislodge the fruit. The fruit so dislodged will fall into the umbrella-like fruit catcher receptacle 18, then fall gently down the slope to the gasket receptacle 20 and then down the chute 74 onto the moving conveyor 40 where it is delivered to the transfer conveyor 22 which carries the fruit to the container 24. When the container 24 is filled, the suitable fork-lift mechanism 26 is operated to lower the container onto the ground and to pick another one up for continued harvesting operation.

As an additional feature, I may provide a trough-like receptacle 110 (FIG. 3) which is below the transfer conveyor and positioned to receive fruit from the conveyor 40. At the bottom of the receptacle a slow-moving belt 112 is carried so that fruit delivered to the receptacle is gradually moved toward the rear of the vehicle until the trough is completely filled. Thus, when it is desired to harvest certain fruit such as cherries, peaches and the like which will bruise easily if piled in a tall container, the transfer conveyor may be moved and the loading done into the trough-like receptacle 110. Then, when the receptacle is loaded, the vehicle may be taken to a stand and the trough emptied into suitable lug boxes or the like.

Referring now to FIG. 18, I have shown an alternate form of pivotable arm 116 for support of a drape which may be employed without the shaker assembly. As shown there, the inner edges of arcuate arms are cut away at 118 toward their outer ends generally along an arc so that the cutaway portion is adapted to encircle the trunk of a tree. Carried within the cutaway portion are rubber gasket elements 120 which actually engage and seal around the tree to prevent fruit from dropping between the arcuate arms.

In FIG. 17 I have shown an alternate form of shaker assembly wherein a generally Y-shaped housing 122 is carried within channel members 124 for reciprocal movement on the frame 11. Rotatably mounted on each arm of the housing is a weighted disc 126, and the discs have weights 128 at corresponding chords thereof. The discs are preferably driven by a toothed timing belt 130 to engage complementary teeth 132 around the discs and ensure positive driving without slipping. Carried on the shaft of each weighted disc 126 is a pivoted arm 134 on the end of which is carried a resilient bearing pad 136. A third bearing pad 138 is carried on the forward end of the Y-shaped housing 122. As shown, each pivotable arm is operated by an actuating link 140. The links 140 are pivotally connected together at 142, and the connection is driven in opposite directions longitudinal of the machine by the piston rod 144 of a hydraulic cylinder (not shown). Thus, when the piston is retracted to the position shown in FIG. 17, the pressure arms are pivoted into engagement with the trunk of the tree with the resilient bearing blocks preventing damage to the bark. Conversely, when the piston rod is extended, the bearing arms are swung upwardly to the position shown in phantom wherein the housing may be moved into or out of engagement with the trunk of the tree, the initial engagement being made by a third bearing block carried on the housing.

Extending upward from the pivotal connection 142 between the actuating arm is a guide member 142a which is loosely movable within an enlarged slot 146 so that a certain amount of lateral play is permitted. Thus, in the case of an irregularly shaped tree contact with one of the bearing arms may occur first and, in that case, the loose connection within the slot will permit the other arm to continue to pivot with the movement being absorbed in lateral movement of the pin.

Again, the discs 126 are weighted identically and, in this case, are pivoted in the same direction so that the centrifugal forces will, at all times be additive. Thus, the discs deliver to the bearing arms 134, and hence, to the trunk of a tree, a continuous revolving force which circumferentially bends and shakes the tree.

Referring now to FIGS. 19 and 20, I have illustrated an alternate form of mounting for the drape support arms wherein the main pivotable arms 136 are carried on shafts which are inclined rearwardly at a slight angle of, say 5°. The arms may be pivoted by any suitable means, such as a rotary hydraulic actuator 138, and when pivoted, the arms swing into the position shown in phantom wherein an arm of equal radius will reach to a somewhat higher elevation than that shown in FIG. 1. However, when the arm is retracted to the full line position, the end of the fixed arm is at a lower level to provide better visibility for the driver without requiring him to sit too high while the vehicle is in motion. This low profile is further benefited by pivoting the trailing support arm on the frame of the vehicle at a point rearward of the inclined shaft. In addition, the tilted fruit chitcher with the trailing support arm 131d displayed rearwardly causes virtually all fruit to drop from the drape directly onto the conveyor 40 rather than onto the gasket assembly.

While the fruit catcher of this invention has been discussed primarily in connection with a tree shaking device mounted on the same vehicle, it is apparent that such devices could be completely separate within the scope of this invention. In some instances, limb shaking devices of conventional type may be operated by laborers afoot or riding in some portion of the vehicle 10. When such separate devices are employed, the gasket forming elements 120 are carried right on the arms 118 as previously described in connection with FIG. 18.

Moreover, in either fruit catcher embodiment the seam sealing device of FIGS. 12, 13 and 14 may be replaced by the simple arrangement of FIG. 18 wherein the leading arms 31a meet in abutment with a resilient seal 141 in firm engagement.

While this invention has been described in connection with preferred embodiments thereof, it is apparent that modifications and changes therein may be made by those skilled in the art without departing from the spirit and scope of this invention as defined by the claims appended hereto.

Having described my invention, I claim:

1. A fruit harvester comprising:
 a frame member,
 a pair of arms at the forward end of said frame pivotably mounted on said frame to pivot back and forth between an active position directed forwardly of said frame wherein they are conditioned to embrace the trunk of a tree, and a retracted position wherein they are directed away from said forward end of the frame,
 flexible sheeting of inverted generally frusto-conical configuration secured at the lower edge to said arms,
 leading support rods secured to the free ends of said pivotable arms to extend along an element of a cone,
 a first trailing pivoted support rod mounted on each of said arms to extend along an element of said cone,
 means on the end of said support rods securing the upper edge of said flexible sheeting thereto so that when said arms are in their active positions said sheeting is held under tension out of engagement with said support rods,
 said leading support rods being substantially engageable with said pivoted support rods when said arms are moved to said retracted position,
 and said sheeting being separable along said leading support rods when they are retracted.

2. The fruit harvester defined by claim 1 including:
 means to close the space between said leading arms when in active position.

3. The fruit harvester defined by claim 1 including:
 a first generally tangential arm extending upward and in advance of one of said leading support rods,
 a second generally tangential arm pivoted on the other of said leading support rods,
 yieldable means biasing said second generally tangential arm so as to be normally disposed to pass below the plane traversed by the end of said first generally tangential support arm but being pivoted under tension of said sheet when said pivotable arms are in active position through said plane,
 the separable portions of said sheet being secured on the ends of said generally tangential arms.

4. The fruit harvester defined by claim 1 including:
 a vehicle,
 said frame member being supported on said vehicle,
 resilient bumper means on said frame adapted to engage the trunk of a tree, and
 means operable when said bumper means are engaging a tree trunk to transmit reciprocal forces to said bumper means.

5. The fruit harvester defined by claim 4 wherein said means for transmitting said forces to said bumper means comprises:
 a subhousing slidably mounted on said frame for reciprocal movement thereon,
 a vertical shaft in said subhousing,
 a pair of circular discs mounted to rotate on said shaft,
 weights of substantially identical magnitude carried within corresponding chords of said circular discs, and
 drive means for positively driving said discs in counter-rotation,
 said bumper means being carried by said subhousing.

6. The fruit harvester defined by claim 1 including:
 a pair of complementary resilient gasket members adapted in one relative position thereof to embrace the trunk of a tree to receive fruit passing between said pivotable arms,
 at least one of said gasket members being pivotable to a retracted position permitting placement and removal of said gasket members from said trunk.

7. The fruit harvester defined by claim 6 including:
 means on at least one of said gasket members forming a gravity chute to conduct articles therefrom.

8. The fruit harvester defined by claim 1 including:
 a pair of second trailing pivoted support rods mounted on said frame to extend along an element of a cone below said leading and first pivoted support rods so as to underlie them when said pivoted arms are in their retracted position, and complementary means on said first and second pivoted support rods engageable when said pivoted arms are retracted.

9. The fruit harvester defined by claim 1 including:

a force transmitting member carried at the forward end of said frame adapted to deliver reciprocal forces in the longitudinal direction thereof, a resilient first bumper mounted on said force transmitting member at the forward end thereof in a position to engage the trunk of a tree on one side thereof, a longitudinally slidable rod on said force transmitting member, an articulated rod pivotally connected at the end of said slidable rod, restraining means confining said articulated rod in a position generally parallel to the longitudinal axis of said frame when said slidable rod is retracted, means biasing said articulated rod outward at an angle to the said longitudinal axis when said slidable rod is extended, means for extending and retracting said slidable rod, and a resilient second bumper mounted at the end of said articulated rod and engageable with the trunk of a tree at the other side thereof when said slidable rod is retracted.

10. The fruit harvester defined by claim 9 including:

a pair of complementary gasket-forming members, one of said members being mounted on said force transmitting member in a position to snugly engage said one side of the trunk of a tree when said trunk is engaged by said resilient first members, and the other of said members being mounted at the end of said articulated rod so as to snugly engage said other side of the trunk of a tree when said slidable rod is retracted and removed to a position in advance of and to one side of said trunk when said slidable rod is extended.

11. The fruit harvester defined by claim 10 including:

means on at least one of said gasket-forming members forming a slideway to conduct articles from said members by gravity, and a conveyor positioned to receive articles from said slideway and conduct them to a point of delivery.

12. The fruit harvester defined by claim 1 including:

a longitudinally slidable rod on said frame, an articulated rod pivotally connected at the end of said slidable rod, restraining means confining said articulated rod in a position generally parallel to the longitudinal axis of said vehicle when said slidable rod is retracted, means biasing said articulated rod outward at an angle to the said longitudinal axis when said slidable rod is extended, means for extending and retracting said slidable rod, and a pair of complementary gasket-forming members below said pivoted arms, one of said members being mounted on said frame in a position to snugly engage the trunk of a tree on one side thereof, the other of said members being mounted at the end of said articulated rod so as to snugly engage the trunk of a tree on the other side thereof when said slidable rod is retracted, and removed to a position in advance of and to one side of said trunk when said slidable rod is extended.

13. The fruit harvester defined by claim 12 including:

means on at least one of said gasket forming members forming a slideway to conduct articles from said members by gravity, and a conveyor positioned to receive articles from said slideway and conduct them to a point of delivery.

14. The fruit harvester defined by claim 1 wherein:

said pivotable arms are mounted on upright shafts which are inclined toward the rear of said frame.

References Cited

UNITED STATES PATENTS

| | | | |
|---|---|---|---|
| 492,952 | 3/1893 | Ball | 56—329 |
| 1,473,081 | 11/1923 | Cook | 56—329 |
| 2,714,281 | 8/1955 | Steele | 56—329 |
| 3,105,346 | 10/1963 | Stanclift | 56—329 |
| 3,105,347 | 10/1963 | Anderson et al. | 56—329 |

RUSSELL R. KINSEY, *Primary Examiner.*